United States Patent
Moore (10) Patent No.: US 9,625,950 B1
(45) Date of Patent: Apr. 18, 2017

(54) PROTECTIVE COVER FOR CONVERTIBLE LAPTOP AND TABLET

(71) Applicant: MAX Interactive, Inc., Costa Mesa, CA (US)

(72) Inventor: Cameron Moore, Costa Mesa, CA (US)

(73) Assignee: MAX Interactive, Inc., Costa Mesa, CA (US)

( * ) Notice: Subject to any disclaimer, the term of this patent is extended or adjusted under 35 U.S.C. 154(b) by 0 days.

(21) Appl. No.: 15/076,397

(22) Filed: Mar. 21, 2016

(51) Int. Cl.
*H05K 7/00* (2006.01)
*H05K 5/00* (2006.01)
*G06F 1/16* (2006.01)

(52) U.S. Cl.
CPC ............ *G06F 1/166* (2013.01); *G06F 1/1652* (2013.01); *G06F 1/1662* (2013.01); *G06F 1/1681* (2013.01)

(58) Field of Classification Search
CPC .................................................... E04F 15/045
USPC .................................................... 361/679.01
See application file for complete search history.

(56) References Cited

U.S. PATENT DOCUMENTS

| | | | |
|---|---|---|---|
| 8,875,879 B2 | 11/2014 | Diebel et al. | |
| 9,049,792 B2 | 6/2015 | Ko et al. | |
| 9,218,025 B2 | 12/2015 | Bates et al. | |
| 9,244,535 B2 | 1/2016 | Bates et al. | |
| 2013/0181909 A1 | 7/2013 | Voronel | |
| 2014/0071606 A1 | 3/2014 | Bates et al. | |
| 2014/0071654 A1 | 3/2014 | Chien et al. | |
| 2015/0272303 A1 | 10/2015 | Brown et al. | |
| 2015/0277509 A1* | 10/2015 | Probst | G06F 1/1616 361/679.12 |
| 2015/0337541 A1* | 11/2015 | Norris | E04F 15/045 52/588.1 |

* cited by examiner

*Primary Examiner* — Jerry Wu
(74) *Attorney, Agent, or Firm* — Charles F. Reidelbach, Jr.

(57) ABSTRACT

A protective cover is for use with a hybrid computer which includes a display that is rotationally mounted to a keyboard. Relative rotation between the display and keyboard configures the hybrid computer as a laptop or a tablet computer. The protective cover includes raised regions and recessed regions. When the hybrid computer is configured as a tablet, the raised regions are received into the recessed regions. This allows outer housing surfaces of the display and keyboard to be in close proximity.

19 Claims, 8 Drawing Sheets

PROTECTIVE COVER FOR CONVERTIBLE LAPTOP AND TABLET

FIELD OF THE INVENTION

The present invention concerns a protective cover for a computer. More particularly, the present invention concerns an advantageous way of providing protection for a hybrid computer that can be converted from a laptop to a tablet without loss of function.

BACKGROUND

Laptop and tablet computers are in wide use. A laptop computer or "laptop" can be described as a display that is rotatably mounted or joined to a keyboard. The display has opposing surfaces including a display surface and an outer housing surface that are joined by peripheral edges of the outer housing of the display. The keyboard has opposing surfaces including an outer housing surface and a keyboard side that are joined by peripheral edges of the outer housing of the keyboard. When the laptop is not in use it is in a "closed configuration" whereby the keyboard side faces the display surface. In use the display is rotated about a hinge whereby it is inclined relative to the keyboard side.

A tablet computer or "tablet" is often a display with no keyboard. There is a desire to have hybrid computers that can function as either a laptop or a tablet. One way to do this is to allow the hinge of a laptop to rotate at or near 360 degrees from the closed configuration to a state at which the keyboard side and the display surface are facing outwardly in opposed directions. In this state the outer housing surface of the keyboard faces the outer housing surface of the display. The hybrid computer can therefore function in either a laptop configuration or a tablet configuration.

There is often desire to protect computers from shock of being dropped and abrasion. With a hybrid computer this presents unique challenges because of the need for outer housing surfaces of the keyboard and display to be in close proximity when in the tablet configuration.

SUMMARY

In a first aspect of the disclosure, a protective cover for a hybrid computer is disclosed. The hybrid computer includes a display that is rotatably mounted to a keyboard. Relative rotation of the display relative to the keyboard enables the hybrid computer to be configured as a laptop in one rotational configuration and a tablet in another rotational configuration. The display has opposing surfaces including a first outer housing surface and a display surface. The keyboard has opposing surfaces including a second outer housing surface and a keyboard surface. The protective cover includes a display guard and a keyboard guard. The display guard is for at least partially surrounding the first outer housing of the display. The display guard defines first raised regions and first recessed regions. The keyboard guard is for at least partially surrounding the second outer housing surface of the keyboard. The keyboard guard defines second raised regions and second recessed regions. When the hybrid computer is in a tablet configuration, the first raised regions of the display guard are positioned within the second recessed regions of the keyboard guard, and the second raised regions of the keyboard guard are positioned within the first recessed regions of the display guard.

With the recessed regions receiving the raised regions, the protective cover thickness can be maximized without impacting an ability to fully rotate the hybrid computer to the tablet configuration. Rotation of a hybrid computer from a closed configuration to an open configuration is about a 360 degree rotation. If the first and second raised regions overlap, then the full rotation may not be realized due to physical interference between the first and second raised regions. This is avoided by allowing the first recessed regions to receive the second raised regions and allowing the second recessed regions to receive the first raised regions. Preferably the recessed regions laterally contain or enclose the raised regions being received. The first and second raised regions then overlap in an interlocking manner with respect to a direction normal to housing surfaces when the hybrid computer is in the tablet configuration.

In one implementation the first recessed regions are openings in the display guard. The openings expose lateral regions of the first outer housing of the display.

In one implementation the first recessed regions are thinner regions of the display guard. The first raised regions have a thickness that is at least 50% greater that the thickness of the first recessed regions.

In one implementation the second recessed regions are openings in the keyboard guard. The openings expose lateral regions of the second outer housing of the keyboard.

In one implementation the second recessed regions are thinner regions of the keyboard guard. The second raised regions have a thickness that is at least 50% greater than the thickness of the second recessed regions.

In one implementation the display guard is divided up into a first proximal portion defining a first proximal area that is closest to an axis of rotation of the display guard relative to the keyboard guard and a first distal area that is farthest from the axis of rotation. Within the first proximal area, all of the second raised regions are received into the first recessed regions when the hybrid computer is placed into the tablet configuration.

In one implementation the keyboard guard is divided up into a second proximal portion defining a second proximal area that is closest to an axis of rotation of the display guard relative to the keyboard guard and a second distal area that is farthest from the axis of rotation. Within the second proximal area, all of the first raised regions are received into the second recessed regions when the hybrid computer is placed into the tablet configuration.

The protective cover can be made one or more materials that can include plastics, rubbers, and metals. Specific examples of resilient materials can include silicon rubber, thermoplastic polyurethane, and natural rubber to name a few. The protective cover can be a composite of two or more materials including a more rigid material and a softer shock-absorbing material.

DETAILED DESCRIPTION OF THE PREFERRED EMBODIMENTS

Figure 1:
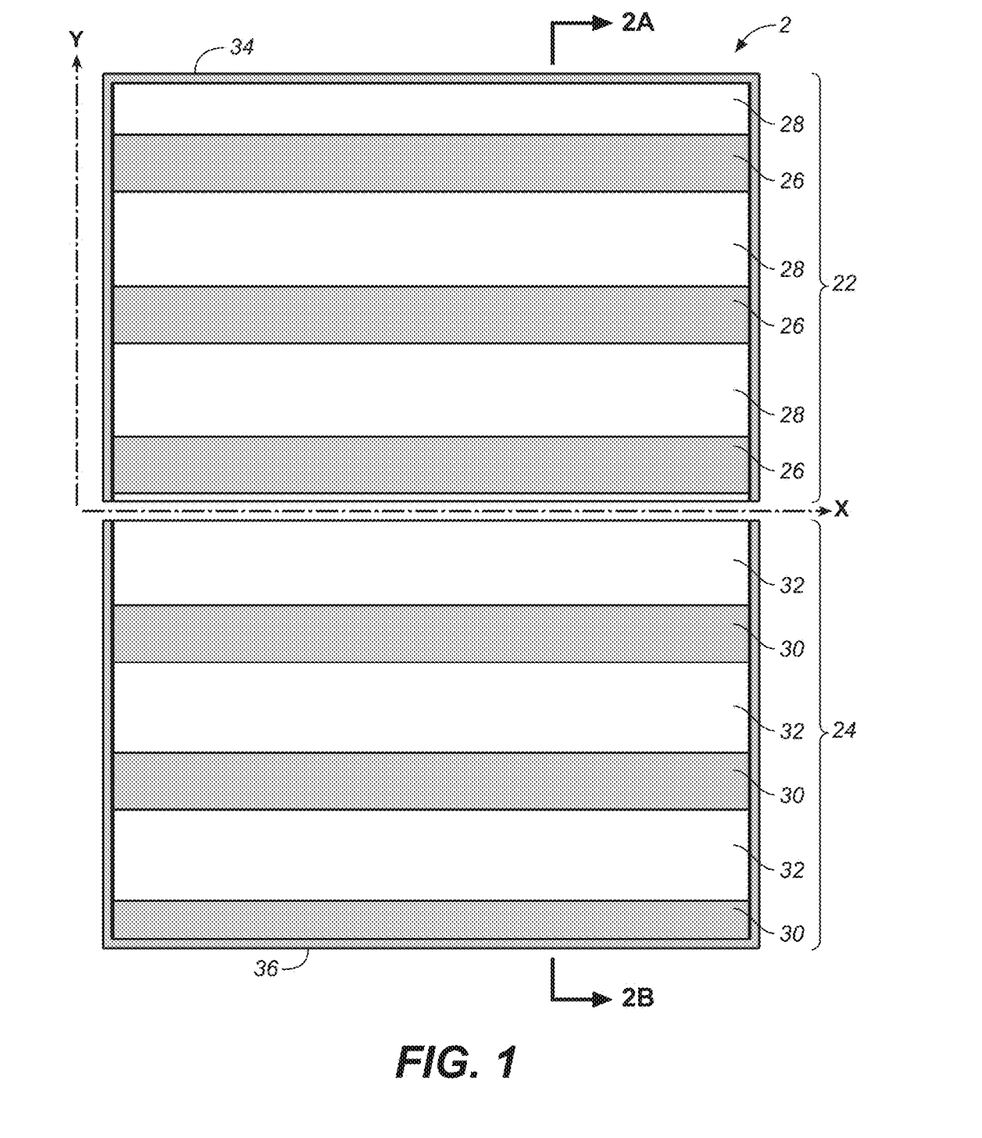
FIG. 1 is a plan view of a first embodiment of a protective cover for a hybrid computer.
Figure 2A:
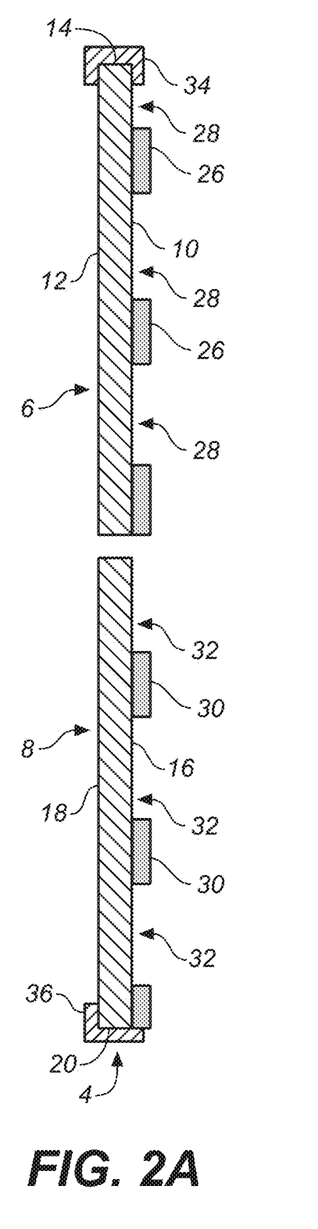
FIG. 2A is a cross-sectional view taken from section 2A-2B of FIG. 1 depicting a first embodiment of a protective cover in which recessed regions are openings.

FIGS. 1 and 2A depict a first embodiment of a protective cover 2 for a hybrid computer 4. FIG. 1 is a plan view of the protective cover 2. FIG. 2A is a cross-sectional view taken though 2A-2B of FIG. 1 with the protective cover 2 installed on a hybrid computer 4. Hybrid computer 4 includes a display 6 that is rotatably mounted to a keyboard 8. Display 6 has opposing surfaces including a first outer housing surface 10 and a display surface 12 joined by a first peripheral edge 14. Keyboard 8 has opposing surfaces including a second outer housing surface 16 and a keyboard surface 18 that are joined by a second peripheral edge 20.

In considering geometric designs various axes and terms are used for convenience. An X-axis (FIG. 1) can be defined along the axis of rotation between the display 6 and the keyboard 8. A Y-axis (FIGS. 1, 2A, 2B) extends parallel to surfaces 10 and 12 and along the display away from the X-axis of rotation. An XY-plane is parallel to the first outer housing surface 10 and the display surface 12. Directions parallel to the XY-plane are referred to as "lateral" directions. A Z-axis (FIGS. 2A, 2B) is perpendicular to the XY-plane. Directions along the Z-axis are referred to as "normal" to the XY-plane and surfaces 10 and 12.

Since the display 6 can rotate relative to the keyboard 8, a V-axis (not shown) can be defined that extends along the keyboard. An XV-plane is parallel to the second outer housing surface 16 and the keyboard surface 18. A W-axis (not shown) is perpendicular to the XV-plane and is referred to as a "normal" direction relative to the XV-plane and to surfaces 16 and 18.

Figure 2B:
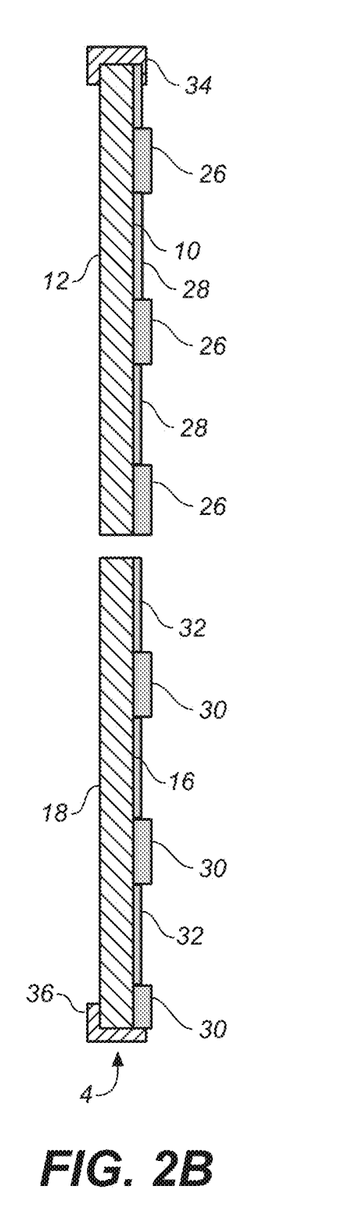
FIG. 2B is a cross-sectional view taken from section 2A-2B of FIG. 1 depicting a second embodiment of a protective cover in which recessed regions are thinned material.

The protective cover 2 includes a display guard 22 and a keyboard guard 24. Display guard 22 partially or completely covers the first outer housing surface 10 of the display 6. The keyboard guard 24 partially or completely covers the second outer housing surface 16 of the keyboard. The display guard 22 includes first raised regions 26 and first recessed regions 28 (FIG. 2B). The keyboard guard 24 includes second raised regions 30 and second recessed regions 32.

The hybrid computer 4 can be folded into a tablet configuration whereby the first outer housing surface 10 of the display 6 faces the second outer housing surface 16 of the keyboard 8. As the hybrid computer 4 is folded into the tablet configuration, the first raised regions 26 are received into the second recessed regions 32. The second recessed regions 32 then laterally enclose the first raised regions 26. At the same time the second raised regions 30 are received into the first recessed regions 28. The first recessed regions 28 then laterally enclose the second raised regions 30. This will be further discussed with respect to FIG. 3D.

The display guard 22 also has a first peripheral bumper guard 34 that defines a peripheral edge of the display guard 22 and also receives the first peripheral edge 14 of the display 6. The first peripheral bumper guard 34 provides protection to the three peripheral edges 14 of display 6. In the embodiment depicted in FIG. 1, the first raised regions 26 join opposed bumper guards 34 that are on opposed edges of protective cover 2 relative to lateral axis X.

The keyboard guard 24 has a second peripheral bumper guard 36 that defines a peripheral edge of the keyboard guard 24 and also receives the second peripheral edge 20 of keyboard 4. The second peripheral bumper guard 36 provides protection to three peripheral edges of 20 of keyboard 8. In the embodiment depicted in FIG. 1, the second raised regions 30 join opposed bumper guards that are on opposed edges of protective cover 2 relative to lateral axis X.

FIGS. 2A and 2B depict two different (first and second) embodiments of protective cover 2 disposed upon hybrid computer 4. According to the embodiment of FIG. 2A, each of the first recessed regions 28 and second recessed regions 32 are openings defined in the protective cover 2. Openings 28 expose regions of the first outer housing surface 10 of the display 6. Openings 32 expose regions of the second outer housing surface 16 of the keyboard 8. First raised regions 26 extend from first outer housing surface 26 along Z or normal to the first outer housing surface 10. In an exemplary embodiment, first raised regions 26 extend one to two millimeters above the first outer housing surface 10. Second raised regions 30 extend from second outer housing surface 16 along Z or normal to the second outer housing surface 16. In an exemplary embodiment the second raised regions 30 extend one to two millimeters above the second outer housing surface 16.

According to the embodiment of FIG. 2B each of the first recessed regions 28 and second recessed regions 32 are relatively thin portions of protective cover 2. First raised regions 26 extend farther along Z from first outer housing surface 10 than do the first recessed regions 28. The material thickness of the raised regions 26 measured along Z can be at least 50% thicker than the material thickness of the recessed regions 28 measured along Z. Second raised regions 30 extend farther along Z from second outer housing surface 16 than do the second recessed regions 32. The material thickness of the raised regions 30 measured along Z can be at least 50% thicker than the material thickness of the recessed regions 32 measured along Z.

FIGS. 3A, 3B, 3C, and 3D depict cross-sectional views of a hybrid computer 4 with protective cover 2 as the computer is folded from a closed configuration to a tablet configuration. All cross-sectional views are those of 2A-2B of FIG. 1 but with different rotational positions of display 6 relative to keyboard 8. The different rotational positions are achieved by rotating display 6 relative to keyboard 8 about hinge 38 whose axis of rotation is coincident with the X-axis.

Figure 3A:
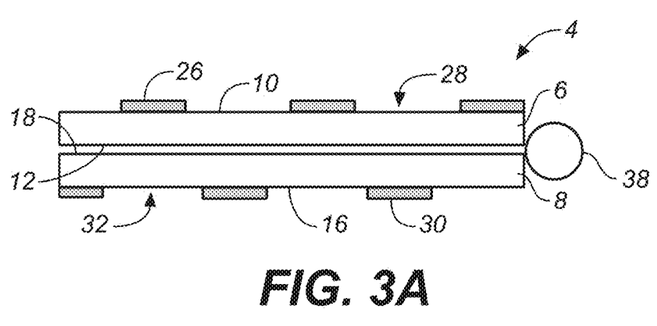
FIG. 3A depicts a hybrid computer in a closed configuration.

FIG. 3A depicts hybrid computer 4 in a closed configuration whereby display surface 12 faces and is in proximity to keyboard surface 18. First raised regions 26 face outwardly from the first outer housing surface 10 of display 6. Second raised regions 30 face outwardly from the second outer housing surface 16 of keyboard 8.

Figure 3B:
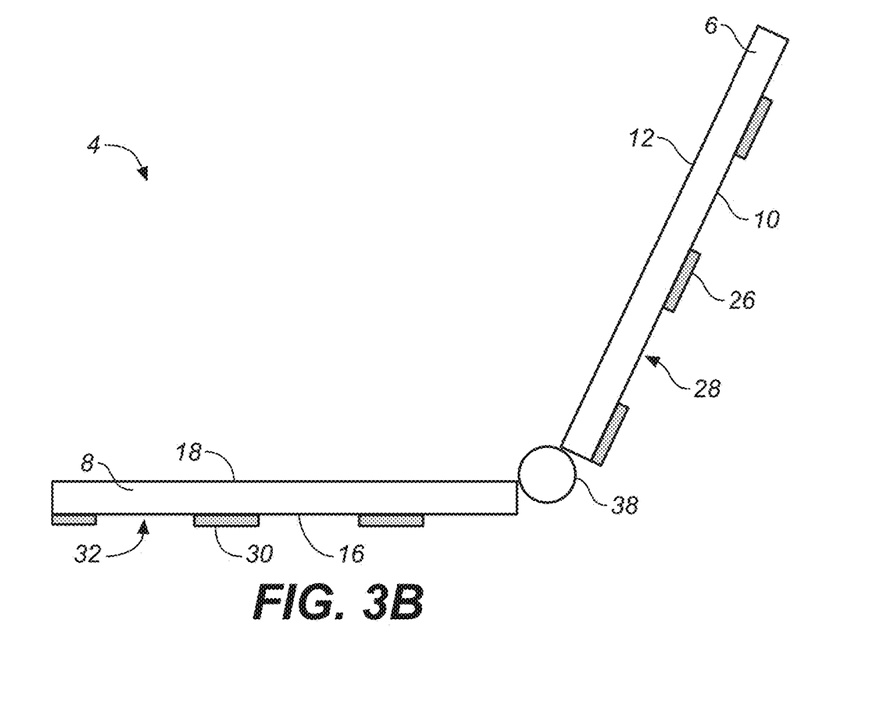
FIG. 3B depicts a hybrid computer in an open laptop configuration.
Figure 3C:
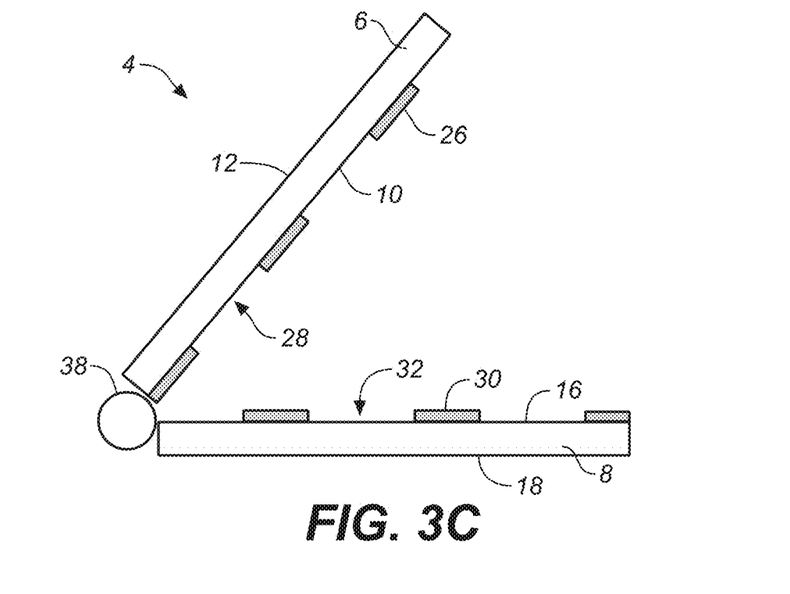
FIG. 3C depicts a hybrid computer being rotated toward a tablet configuration.

FIG. 3B depicts hybrid computer 4 in an open laptop configuration whereby a user can type using keyboard surface 18 and view images on display surface 12. FIG. 3C depicts the hybrid computer 4 flipped over (from FIG. 3B) as the display 6 has been rotated more than 270 degrees from the closed configuration of FIG. 3A toward the tablet configuration.

Figure 3D:
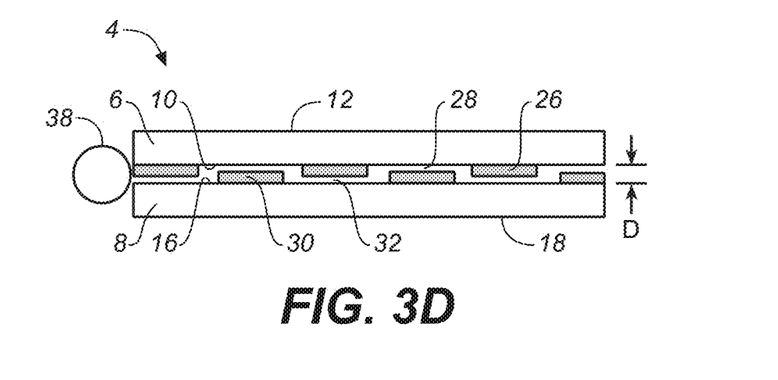
FIG. 3D depicts a hybrid computer in a tablet configuration.

FIG. 3D depicts hybrid computer 4 in the tablet configuration whereby a user can interact with display surface 12 using a finger or pen. In this configuration the display 6 has been rotated relative to the keyboard 8 about hinge 38 by about 360 degrees. In this configuration the first outer housing surface 10 (of display 6) faces second outer housing surface 16 (of keyboard 8). The first raised regions 26 extend inwardly from first outer housing surface 10 into a cavity defined between surfaces 10 and 16. The second raised regions 30 extend into the cavity defined between surfaces 10 and 16. In this closed configuration the first raised regions 26 are received into second recessed regions 32. The second raised regions 30 are received into first recessed regions 28. The first raised regions 26 and the second raised regions 30 overlap along the Z-axis or normal direction relative to surfaces 10 and 16. With this arrangement the distance D between surfaces 10 and 16 is minimized due to non-interference between first raised regions 26 and second raised regions 30. This can be important for the proper operation of hybrid computer 4 in the tablet configuration.

Figure 4:
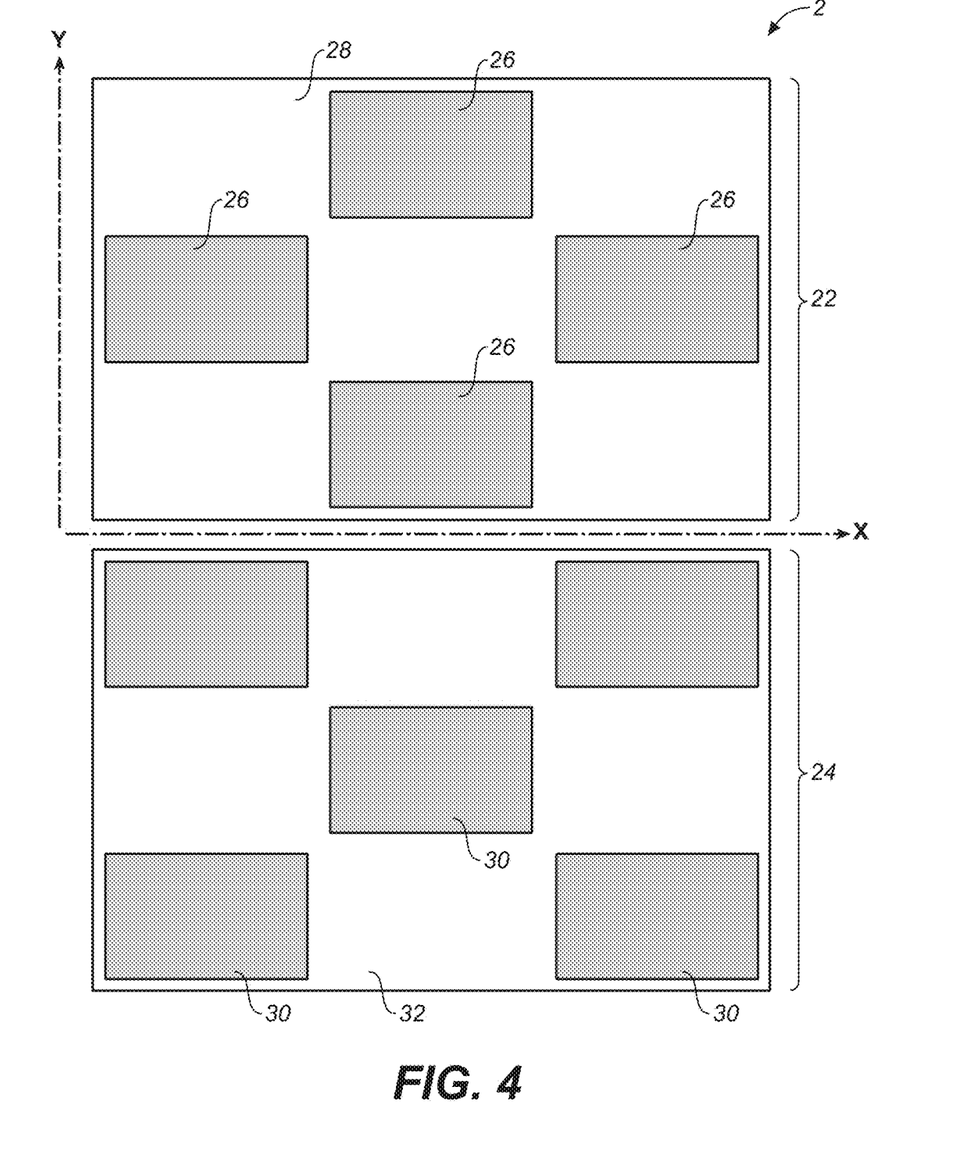
FIG. 4 depicts a plan view of a third embodiment of a protective cover for a hybrid computer.

FIG. 4 depicts a third embodiment of protective cover 2 in plan view including display guard 22 and keyboard guard 24. Display guard 22 includes "island-like" raised regions 26 that do not laterally extend to any of the peripheral bumper guards 34 (not shown). Recessed region 28 is defined by thinner material than the raised regions (similar to FIG. 2B). The thinner material of the recessed region 28 joins the thicker material of the raised regions 26.

Keyboard guard 24 includes "island-like" raised regions 30 that do not laterally extend to any of the peripheral bumper guards (not shown). Recessed region 32 is defined by thinner material than the raised regions (similar to FIG. 2B). The thinner material of the recessed region 32 joins the thicker material of the raised regions 30.

Figure 5:
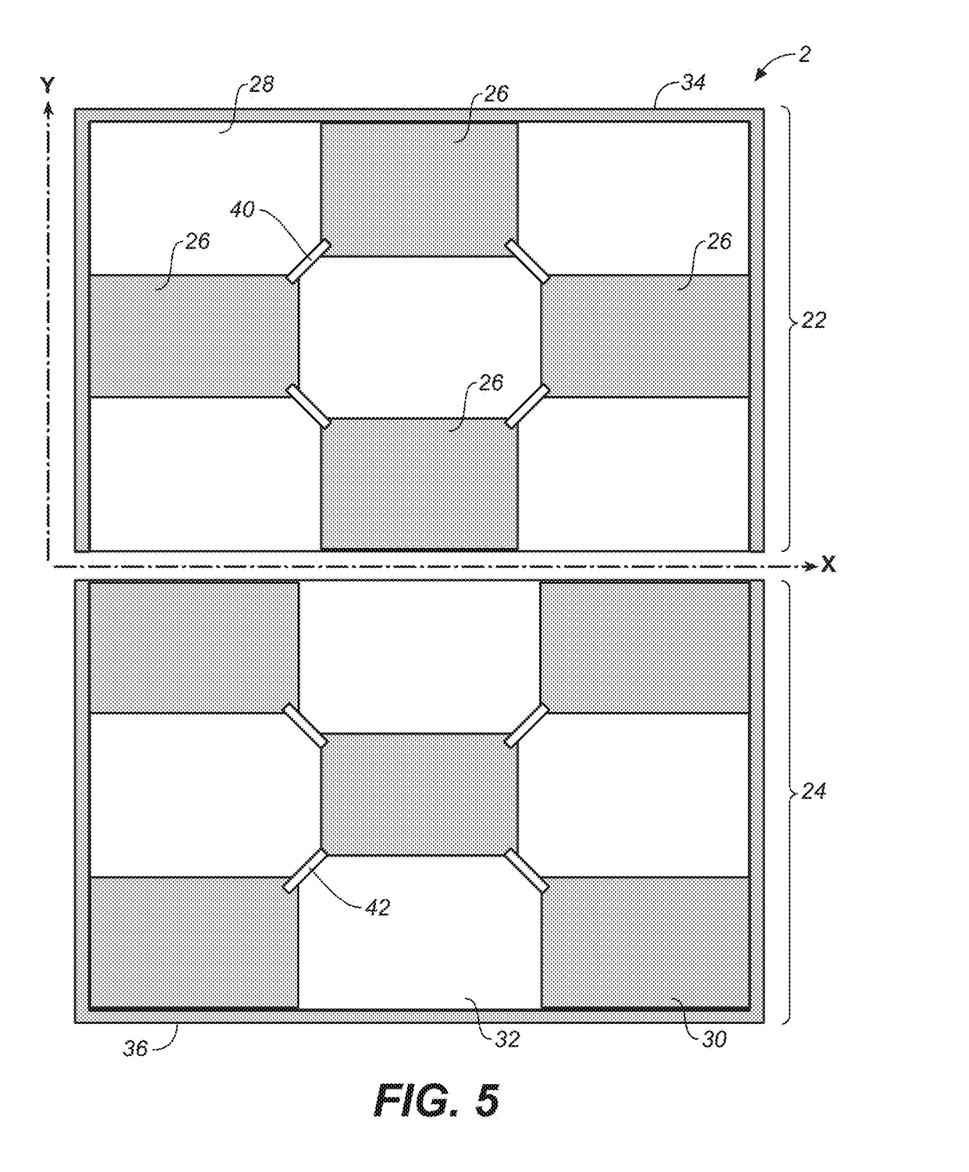
FIG. 5 depicts a plan view of a fourth embodiment of a protective cover for hybrid computer.

FIG. 5 depicts a fourth embodiment of protective cover 2 in plan view including display guard 22 and keyboard guard 24. Display guard 22 includes first rectangular raised regions 26 that extend to the peripheral bumper guard 34. Recessed regions 28 are openings in the display guard 22. Coupling the first raised regions 26 are thin connective portions 40. Keyboard guard 24 includes second rectangular raised regions 30 some of which extend to the bumper guard 36 (except for a central raised region 30). Recessed regions 32 are openings in the display guard. Coupling the second raised regions 30 are thin connective portions 42.

In FIGS. 4 and 5 the raised regions 26 and 30 are depicted as rectangular and laterally bounded by edges that are parallel to the X and Y axes respectively. Other variations are possible. For example, the "islands" could be hexagonal, octagonal, square, square with rounded corners, rectangular with rounded corners, random shapes, trapezoidal shapes, triangular shapes, or any other practical geometry. For each of these alternatives, the raised regions 26 and 30 are received within the recessed regions 28 and 32 respectively when the hybrid computer is folded into the tablet configuration. Thus the illustrations of FIGS. 3A to 3D still apply although the exact geometry of the raised and recessed regions may vary.

Although FIGS. 4 and 5 each depict only nine raised regions (26 and 30) other designs are possible with more raised regions. In addition, the raised regions may have very different arrangements than those depicted in FIGS. 4 and 5.

Yet other variations are possible. For example, some of the raised ridges (26 or 30) of the FIG. 4 embodiment may extend to the bumper guards (34 or 36). The embodiment of FIG. 5 may have raised regions (26 or 30) that are coupled to the bumper guard (34 or 36) by thin connective portions (40 or 42).

Figure 6:
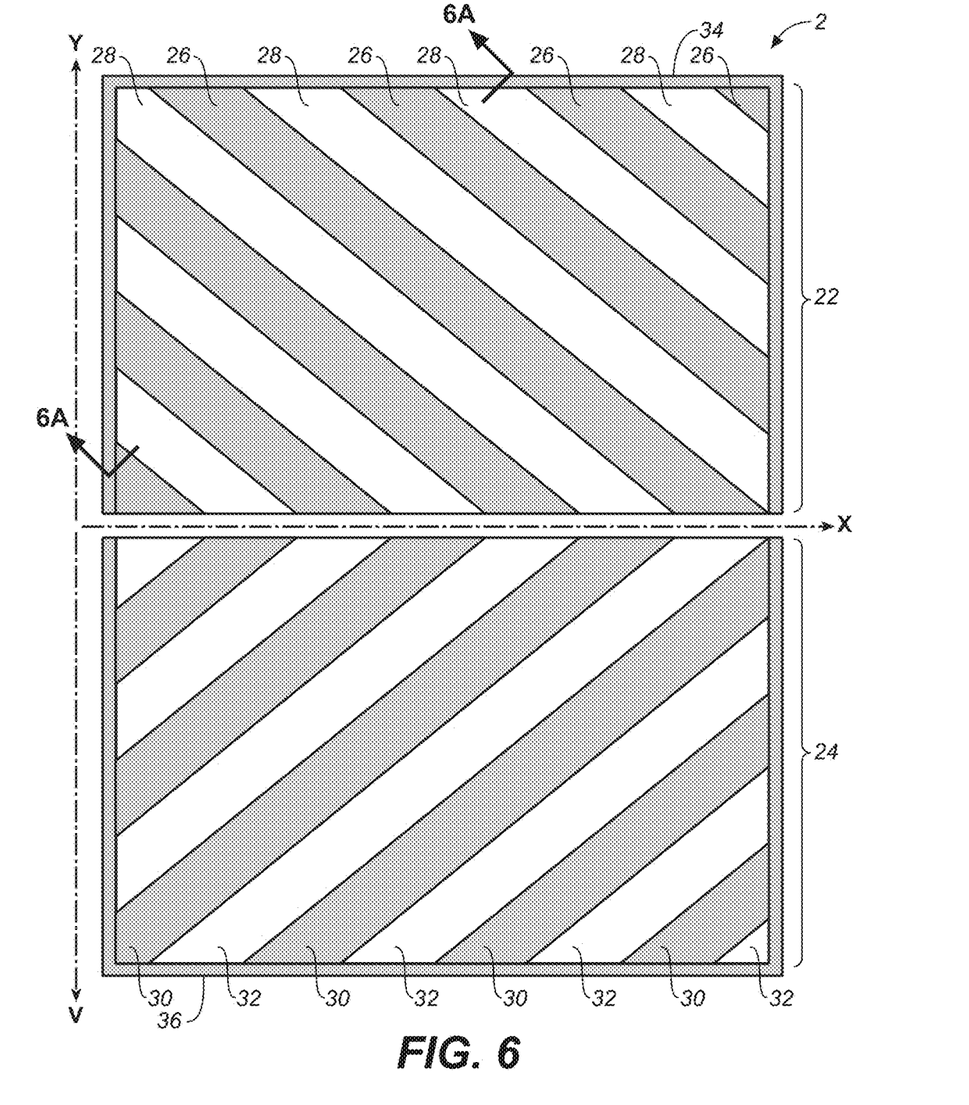
FIG. 6 depicts a plan view of a fifth embodiment of a protective cover for a hybrid computer.
Figure 6A:
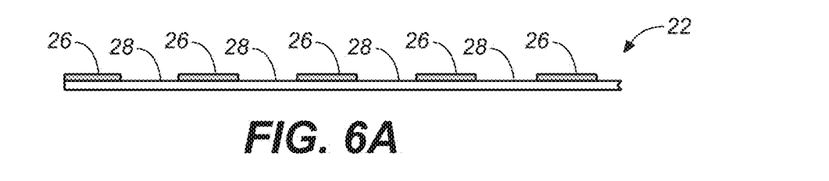
FIG. 6A depicts a cross-sectional view taken through 6A-6A of FIG. 6.

FIG. 6 depicts a fifth embodiment of protective cover 2 in which the first raised regions 26 extend laterally at an oblique angle relative to the axes X and Y. Thus, the first raised regions 26 extend between adjacent bumper guards 34. Between the first raised regions 26 are first recessed regions 28. The second raised regions 30 extend laterally at an oblique angle relative to the axes X and V. The second raised regions 30 extend between adjacent bumper guards 36. Between the second raised regions 30 are second recessed regions 32. FIG. 6A is a cross-sectional view taken through 6A-6A of FIG. 6 illustrating raised ridges 26 and recesses 28. In the tablet configuration (similar to FIG. 3D) the first raised regions 26 are received within the second recessed regions 32 and the second raised regions 30 are received within the first recessed regions 28.

Figure 7:
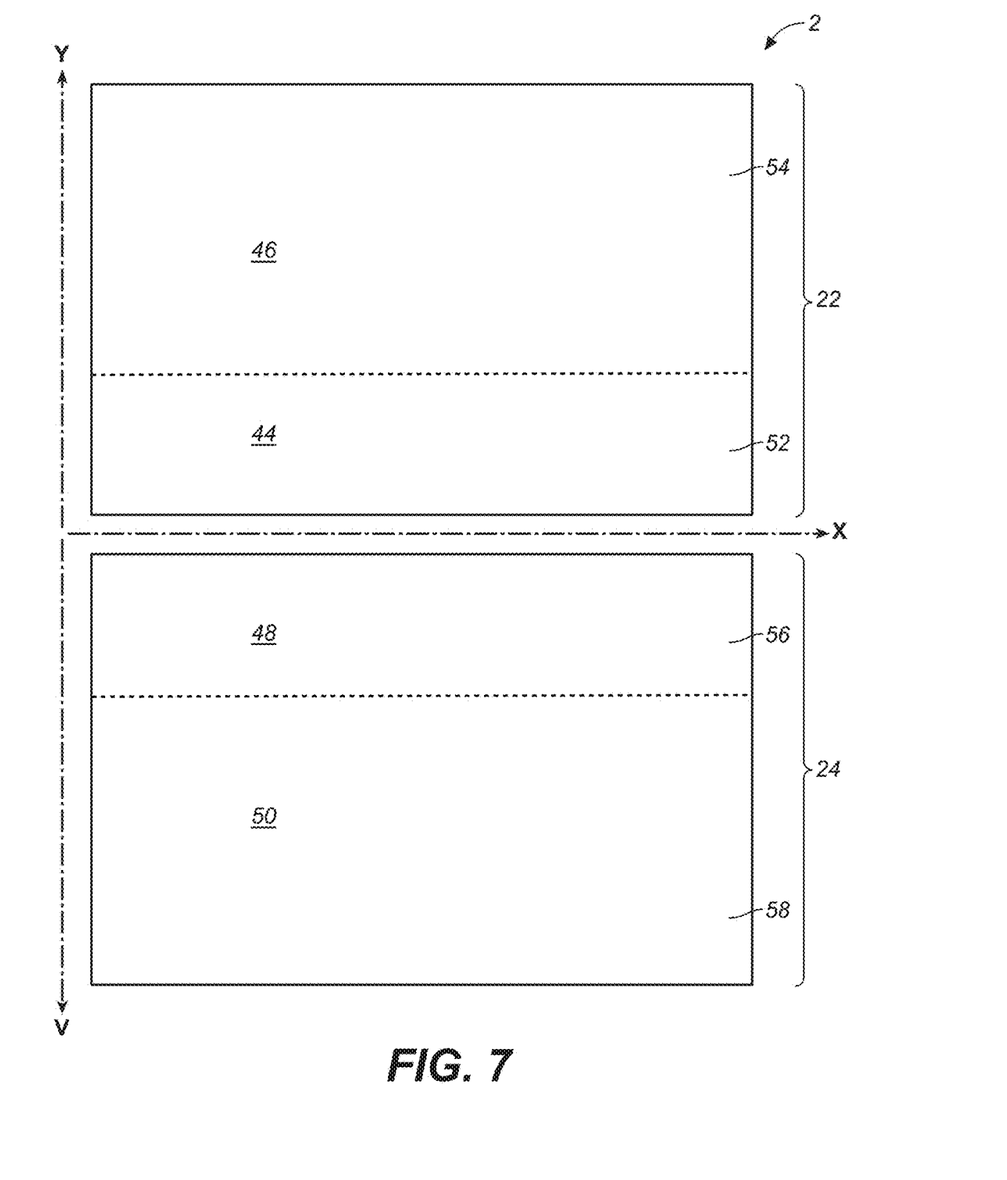
FIG. 7 depicts a plan view of a sixth embodiment of a protective cover for a hybrid computer.

FIG. 7 depicts a plan view of a sixth embodiment of a protective cover 2. In this embodiment the display guard 22 is divided up into two areas including a first proximal area 44 that is closest to the hinge axis X and a first distal area 46 that is farthest from the hinge axis X. The keyboard guard 24 is likewise divided into two areas including a second proximal area 48 that is closest to the hinge axis X and a second distal area 50 that is farthest from the hinge axis X. In one embodiment the first proximal area 44 covers between one third and one half of a total lateral area of the display guard 22. In one embodiment the second proximal area 48 covers between one third and one half of a total lateral area of the keyboard guard 24.

Display guard 22 includes a first proximal portion 52 that defines the first proximal area 44 and a first distal portion 54 that defines the first distal area 46. Keyboard guard 24 includes a second proximal portion 56 that defines the second proximal area 48 and a second distal portion 58 that defines the second distal area 50.

When the hybrid computer 4 is placed into the tablet configuration (i.e., that depicted in FIG. 3D) the first proximal area 44 overlays the second proximal area 48 thereby defining a proximal area of overlap (44 and 48). Within the proximal area of overlap the first raised regions 26 are received within the second recessed regions 32 and the second raised regions 30 are received within the first recessed regions 28. Therefore the first raised regions 26 and the second raised regions 30 do not interfere with each other within the proximal area of overlap (44 and 48) along the direction that is normal to the XY-plane. This is most important within the proximal areas 44 and 48 that are closest to the hinge axis X.

In the tablet configuration the first distal area 46 overlays the second distal area 50 defining a distal area of overlap (46 and 50). Within the distal area of overlap a degree of interference between the raised regions 26 and 30 is permissible because the distal area of overlap (46 and 50) is farther from the hinge axis X.

The specific embodiments and applications thereof described above are for illustrative purposes only and do not preclude modifications and variations encompassed by the scope of the following claims.

What I claim is:

1. A hybrid computer system comprising a protective cover at least partially surrounding a hybrid computer, the hybrid computer having a display with three peripheral edges that is rotatably mounted to a keyboard about a single axis of rotation, the hybrid computer having a closed configuration with the display surface facing the keyboard surface, the display having opposing surfaces including a first outer housing surface and a display surface, the keyboard having opposing surfaces including a second outer housing surface and a keyboard surface, the protective cover further comprising:
- a display guard for at least partially surrounding the first outer housing surface of the display, the display guard defining first raised regions and first recessed regions of the display guard and having a peripheral bumper guard providing protection to the three peripheral edges of the display;
- a keyboard guard for at least partially surrounding the second outer housing surface of the keyboard, the keyboard guard defining second raised regions and second recessed regions of the keyboard guard;
- wherein when the hybrid computer is in a tablet configuration, the first raised regions of the display guard are positioned within the second recessed regions of the keyboard guard and the second raised regions of the keyboard guard are positioned within the first raised recesses of the display guard thereby allowing a rotation about the single axis of rotation from the closed configuration to the tablet configuration without interference between the first raised regions of the display guard and the second raised regions of the keyboard guard which would otherwise limit the range of the rotation.

2. The protective cover of claim 1 wherein the first recessed regions are laterally extending openings in the display guard that expose corresponding lateral regions of the first outer housing of the display.

3. The protective cover of claim 1 wherein the first recessed regions are thinner regions of the display guard and wherein the first raised regions of the display guard are thicker regions of the display guard that are at least 50% thicker than the thinner regions of the display guard.

4. The protective cover of claim 1 wherein the second recessed regions are laterally extending openings in the keyboard guard that expose corresponding lateral regions of the second outer housing of the keyboard.

5. The protective cover of claim 1 wherein the second recessed regions are thinner regions of the keyboard guard and wherein the second raised regions of the keyboard guard are thicker regions of the keyboard guard that are at least 50% thicker than the thinner regions of the keyboard guard.

6. The protective cover of claim 1 wherein the display guard includes a peripheral bumper guard that protects peripheral outer edges of the display, at least some of the first raised regions extend to and are directly joined to the peripheral bumper guard.

7. The protective cover of claim 6 wherein at least some of the first raised regions span and connect a region that is bounded by two perpendicular adjacent outer edges of the bumper guard.

8. The protective cover of claim 6 wherein at least some of the first raised regions span and connect a region that is bounded by two parallel opposing outer edges of the bumper guard.

9. The protective cover of claim 1 wherein the display guard defines a first proximal area that is closest to an axis of rotation of the display guard with respect to the keyboard guard and a first distal area that is farthest from the axis of rotation, all of the second raised regions are received within the first recessed regions throughout the first proximal area when the hybrid computer is in the tablet configuration.

10. The protective cover of claim 1 wherein the keyboard guard defines a second proximal area that is closest to an axis of rotation of the display guard with respect to the keyboard guard and a second distal area that is farthest from the axis of rotation, all of the first raised regions are received into the second recessed regions throughout the second proximal area when the hybrid computer is in the tablet configuration.

11. A hybrid computer system comprising:
- a display having opposed surfaces including a display surface and a first outer housing surface;
- a keyboard pivotally mounted to the display about a single axis of rotation and having opposed surfaces including a keyboard surface and a second outer housing surface, the hybrid computer having a closed configuration with the display surface facing the keyboard surface, rotating the display relative to the keyboard by about 360 degrees about the single axis of rotation from the closed configuration provides a tablet configuration for the hybrid computer system whereby the first outer housing portion faces the second outer housing surface and defines a cavity therebetween;
- a display guard at least partially surrounding the first outer housing surface of the display, the display guard defining first raised regions that extend from the first outer housing surface;
- a keyboard guard at least partially surrounding the second outer housing surface of the keyboard, the keyboard guard defining second raised regions coupled by at least one thin connective portion, the second raised regions and the at least one thin connective portion are extended from the second outer housing surface; and
- in the tablet configuration the first raised regions and the second raised regions extend into the cavity and overlap with respect to a Z-axis direction that is normal to the first and second outer housing surfaces and do not overlap with respect to any lateral area that is perpendicular to the Z-axis to allow the about 360 degree range of motion about the single axis of rotation.

12. The hybrid computer system of claim 11 wherein the display guard defines first recessed regions, the second raised regions of the keyboard guard are received within the first recessed regions.

13. The hybrid computer system of claim 12 wherein the first recessed regions are openings in the display guard that expose corresponding lateral regions of the first outer housing of the display.

14. The hybrid computer system of claim 12 wherein the first recessed regions are thinner regions of the display guard and wherein the first raised regions of the display guard are thicker regions of the display guard that are at least 50% thicker than the first recessed regions of the display guard.

15. The hybrid computer system of claim 11 wherein the keyboard guard defines second recessed regions, the first raised regions of the display guard are received into the second recessed regions.

16. The hybrid computer system of claim 15 wherein the first recessed regions are laterally extending openings in the keyboard guard that expose corresponding lateral regions of the second outer housing of the keyboard.

17. The hybrid computer system of claim 15 wherein the second recessed regions are thinner regions of the keyboard guard and wherein the second raised regions of the keyboard guard are thicker regions of the keyboard guard that are at least 50% thicker than the second recessed regions of the keyboard guard.

18. The hybrid computer system of claim 11 wherein the display guard defines a first proximal area that is closest to an axis of rotation of the display guard with respect to the keyboard guard and a first distal area that is farthest from the axis of rotation, the display guard defines first recessed regions within the first proximal area that receive the second raised regions in the tablet configuration.

19. The hybrid computer system of claim 11 wherein the keyboard guard defines a second proximal area that is closest to an axis of rotation of the display guard with respect to the keyboard guard and a second distal area that is farthest from the axis of rotation, the keyboard guard defines second recessed regions within the first proximal area that receive the second raised regions in the tablet configuration.

\* \* \* \* \*